United States Patent [19]
Goelzer

[11] Patent Number: 5,114,682
[45] Date of Patent: May 19, 1992

[54] APPARATUS FOR RECOVERING HEAT ENERGY FROM CATALYST REGENERATOR FLUE GASES

[75] Inventor: Alan R. Goelzer, Atkinson, N.H.

[73] Assignee: Stone & Webster Engineering Corporation, Boston, Mass.

[21] Appl. No.: 648,584

[22] Filed: Jan. 31, 1991

Related U.S. Application Data

[60] Continuation of Ser. No. 472,895, Jan. 31, 1990, Pat. No. 4,904,372, which is a division of Ser. No. 273,266, Nov. 18, 1988, abandoned.

[51] Int. Cl.⁵ .................................................. B01J 8/28
[52] U.S. Cl. ........................................ 422/142; 422/141; 422/144; 422/145; 422/146
[58] Field of Search ................ 422/144, 146, 145, 141

[56] References Cited

U.S. PATENT DOCUMENTS

| | | | |
|---|---|---|---|
| 2,753,925 | 7/1956 | Campbell et al. | 158/1 |
| 2,758,979 | 8/1956 | Guthrie | 252/417 |
| 2,853,455 | 9/1958 | Campbell et al. | 252/417 |
| 2,900,325 | 8/1959 | Rice et al. | 208/78 |
| 3,012,082 | 12/1961 | Kelly, Jr. et al. | 260/680 |
| 3,012,962 | 12/1961 | Dygert | 208/154 |
| 3,076,769 | 2/1963 | Pfeiffer | 252/417 |
| 3,087,898 | 4/1963 | Pfeiffer et al. | 252/416 |
| 3,137,133 | 6/1964 | Wilson et al. | 60/39.02 |
| 3,152,064 | 10/1964 | Osborn | 208/78 |
| 3,197,284 | 7/1965 | Hoekstra | 23/212 |
| 3,247,129 | 4/1966 | Roelofsen et al. | 252/417 |
| 3,305,475 | 2/1967 | Waldby et al. | 208/78 |
| 3,363,993 | 1/1968 | Campbell | 23/288 |
| 3,401,124 | 9/1968 | Goulden | 252/414 |
| 3,424,672 | 1/1969 | Mitchell | 208/164 |
| 3,448,037 | 6/1969 | Bunn, Jr. et al. | 208/164 |
| 3,532,620 | 10/1970 | Asmus et al. | 208/113 |
| 3,617,496 | 11/1971 | Bryson et al. | 208/80 |
| 3,617,497 | 11/1971 | Bryson et al. | 208/80 |
| 3,702,308 | 11/1972 | Bauer et al. | 252/417 |
| 3,751,359 | 8/1973 | Bunn, Jr. | 208/155 |
| 3,801,493 | 4/1974 | Youngblood et al. | 208/78 |
| 3,801,496 | 4/1974 | Benner | 208/111 |
| 3,849,291 | 11/1974 | Owen | 208/78 |
| 3,894,934 | 7/1975 | Owen et al. | 208/78 |
| 3,894,935 | 7/1975 | Owen | 208/78 |
| 3,928,172 | 12/1975 | Davis, Jr. et al. | 208/77 |
| 3,993,556 | 11/1976 | Reynolds et al. | 208/75 |
| 4,010,094 | 3/1977 | McKinney | 208/164 |
| 4,033,856 | 7/1977 | Colvert et al. | 208/102 |
| 4,033,857 | 7/1977 | Williams et al. | 208/102 |
| 4,146,464 | 3/1979 | Graven et al. | 208/120 |
| 4,226,701 | 10/1980 | Graven et al. | 208/21 |
| 4,331,533 | 5/1982 | Dean et al. | 208/113 |
| 4,332,674 | 6/1982 | Dean et al. | 208/120 |
| 4,336,160 | 6/1982 | Dean et al. | 252/417 |
| 4,434,049 | 2/1984 | Dean et al. | 208/153 |

(List continued on next page.)

FOREIGN PATENT DOCUMENTS 2596059 12/1987 France.

OTHER PUBLICATIONS

J. L. Mauleon et al., "Characterization and Selection of Heavy Feeds for Upgrading through Fluid Catalytic Cracking Process", World Petroleum Congress, 1987.

Primary Examiner—Robert J. Warden
Assistant Examiner—Amalia L. Santiago
Attorney, Agent, or Firm—Hedman, Gibson & Costigan

[57] ABSTRACT

An improved fluidized catalytic cracking-catalyst regeneration process for catalytically cracking heavy hydrocarbon feedstocks is provided which comprises first and second, relatively lower and higher temperature, catalyst regeneration zones, wherein CO-rich effluent flue gas from the first regeneration zone is combusted in a CO-incinerator/combustor means to substantially convert all CO present therein to $CO_2$. The effluent gas from the CO-incinerator/combustor is then combined with the effluent flue gas from the second regeneration zone, with the combined streams thereafter being sent to an expansion turbine-compressor means to recover the work energy therefrom and to provide at least all the compressed air requirements of the first and second regeneration zones, and preferably in addition the compressed air requirements of the CO-incinerator/combustion means.

1 Claim, 1 Drawing Sheet

U.S. PATENT DOCUMENTS

| | | | |
|---|---|---|---|
| 4,556,479 | 12/1985 | Mauleon et al. | 208/164 |
| 4,582,912 | 4/1986 | Saleh et al. | 549/239 |
| 4,600,499 | 7/1986 | Hettinger, Jr. | 208/113 |
| 4,601,813 | 7/1986 | Izumi et al. | 208/22 |
| 4,601,814 | 7/1986 | Mauleon et al. | 208/113 |
| 4,664,778 | 5/1987 | Reinkemeyer | 208/113 |
| 4,717,466 | 1/1988 | Herbet et al. | 208/113 |
| 4,744,962 | 5/1988 | Johnson et al. | 423/235 |
| 4,749,470 | 6/1988 | Herbet et al. | 208/85 |
| 4,780,195 | 10/1988 | Miller | 208/120 |
| 4,786,400 | 11/1988 | Farnsworth | 208/80 |
| 4,789,459 | 12/1988 | Lumbroso et al. | 208/155 |
| 4,814,068 | 3/1989 | Herbst et al. | 208/155 |
| 4,828,680 | 5/1989 | Green et al. | 208/120 |

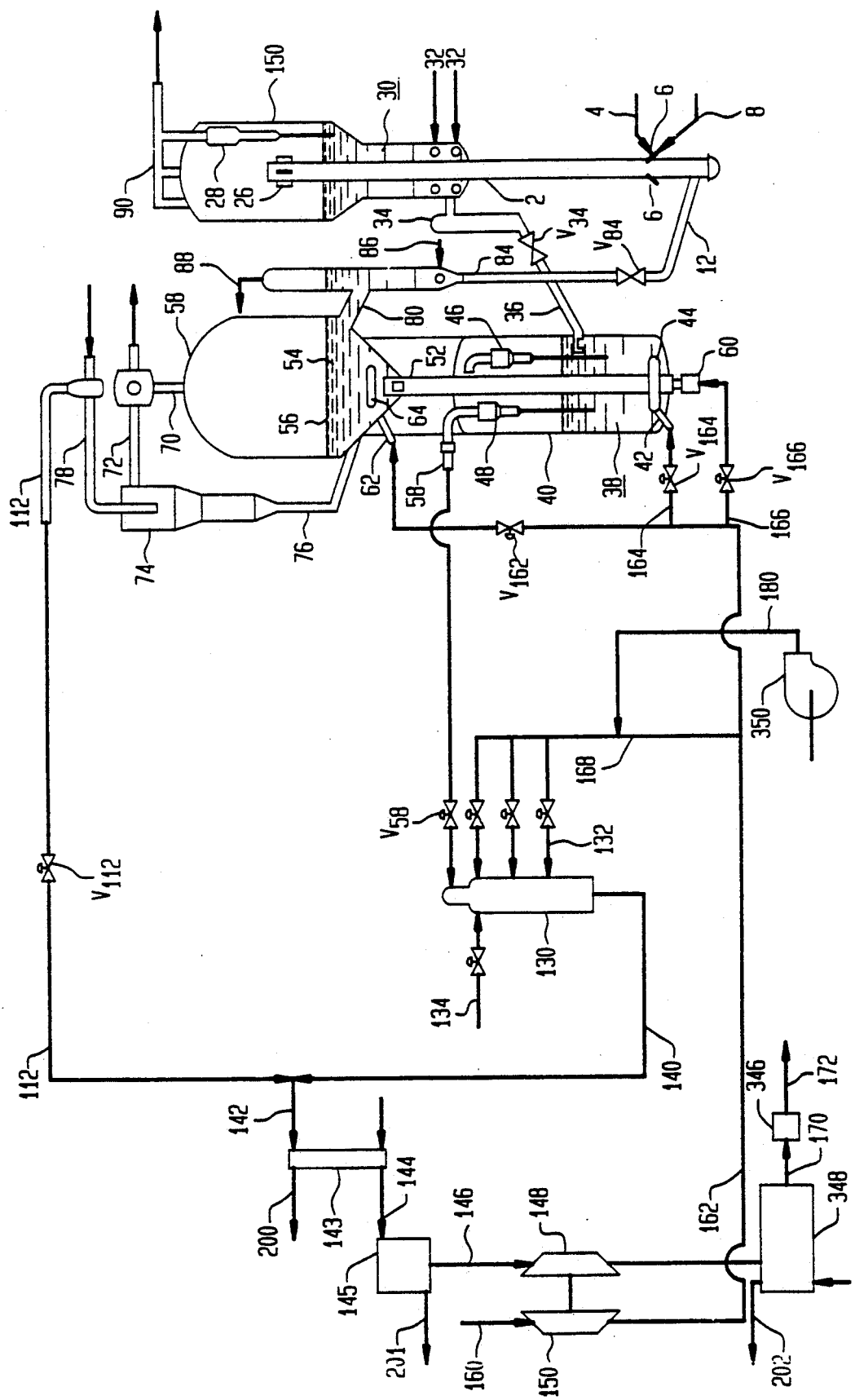

APPARATUS FOR RECOVERING HEAT ENERGY FROM CATALYST REGENERATOR FLUE GASES

This is a continuation of application Ser. No. 07/472,895, filed Jan. 31, 1990, issued as U.S. Pat. No. 4,904,372 on Feb. 27, 1990, which is a division of application Ser. No. 07/273,266 filed Nov. 18, 1988 now abandoned.

FIELD OF THE INVENTION

The present invention relates to the field of fluidized catalytic cracking of heavy hydrocarbon feedstocks. In particular, this invention relates to an improved method and apparatus for catalytically cracking heavy hydrocarbon feedstocks at elevated temperatures wherein catalyst regeneration is conducted in two or more steps comprising separate high and low temperature regeneration stages. More specifically this invention relates to such an improved method and apparatus which is substantially self-powering whereby equipment and operating costs are reduced significantly, and efficiency is maximized.

BACKGROUND OF THE INVENTION

Fluidized catalytic cracking (FCC) processes have been used extensively in the conversion of high boiling portions of crude oils such as gas oil and heavier components customarily referred to use as residual oils, reduced crude oils, atomspheric tower bottoms, topped crudes, vacuum resids, and the like, to produce useful products such as gasoline, fuel oils, light olefins and other blending stocks. The processing of such heavy hydrocarbon feedstocks which comprise very refractory components typically requires severe operating conditions including high temperatures which have presented problems with plant materials of construction, catalyst impairment and increased catalyst coking.

At present, there are several processes available for fluid catalytic cracking of such heavy feedstocks. A particularly successful approach which significantly diminishes such problems as mentioned above is described, for example, in U.S. Pat. Nos. 4,664,778; 4,601,814; 4,336,160; 4,332,674; and 4,331,533. In such processes residual oils or vapors thereof are contacted with hot finely-divided solid catalyst particles in a fluidized solid state in a reactor section, e.g. an elongated riser reactor, to produce cracked products comprising lower molecular weight hydrocarbons typically used in motor gasolines and distillate fuels. A catalyst regeneration section is connected by conduits to the reactor section, through which circulation of the catalyst is maintained to regenerate the catalyst on a continuous basis.

The regeneration section comprises two separate relatively lower and higher temperature catalyst regeneration zones which minimize the severity of catalyst regeneration. Hydro-carbonaceous deposits (coke) formed on the catalyst surface, after volatile hydrocarbons are separated therefrom, are initially combusted in a first catalyst regenerator zone in the presence of a restricted amount of oxygen-containing gas, e.g., air, at relatively mild temperatures sufficient to selectively burn most of the hydrogen component present in the coke deposits and some of the hydrocarbonaceous component to form a partially regenerated catalyst and a first regeneration zone flue gas effluent rich in CO. This relatively mild first regeneration serves to limit localized catalyst hot spots in the presence of steam formed during the hydrogen combustion such that the formed steam will not substantially reduce catalyst activity.

The partially regenerated catalyst now substantially free of hydrogen in the remaining coke deposits thereon which is recovered from the first regeneration zone is then passed to a second relatively higher temperature regeneration zone designed to minimize catalyst inventory and residence time at higher temperature while promoting a carbon combustion rate to achieve a recycled catalyst with significantly reduced coke content. This operation permits higher regeneration temperatures to be employed with a lower catalyst deactivation rate than is possible in single stage catalyst regenerators. In the second regeneration zone, remaining coke deposits are substantially completely burned to $CO_2$ at elevated temperatures to form hot regenerated catalyst and a hot $CO_2$-rich second regeneration zone flue gas stream, useful, for example, in generating process steam.

In typical operation, regeneration of catalyst particles by combustion of hydrocarbonaceous deposits thereon in the regeneration zones is effected by maintaining the particles in a fluidized condition in the presence of the combustion gas, e.g. air. The combustion air thus additionally acts as a fluidizing gas by passing upwards through the regeneration zones at a rate sufficient to maintain the particles in a fluidized bed, i.e., in a turbulent state with quasi-liquid properties. Some fluidizing air is also employed as a transfer medium to circulate the catalyst particles continuously through the regenerator and reactor sections.

Such fluidized catalytic cracking processes, especially those employing two or more catalyst regeneration zones as described above, can thus require large volumes of compressed fluidizing/combustion and transfer gas, e.g. compressed air, with corresponding extensive investment in facilities required to operate the air compressors. Power facilities and motive power supply have therefore become some of the major expenses of fluidized catalytic cracking of residual oils.

Flue gases which emerge from the first and second regeneration zones in such processes as described above represent a large energy potential which can be utilized to supply at least part of the power used in the system for compressed air requirements. For example, the flue gases, usually at high temperature and elevated pressure, can be passed to respective tertiary separators to remove particle fines or solids, and then directed to respective expansion turbines to supply power to an air compressor serving as a source of compressed air for the regeneration process. Further, the combustion of CO to $CO_2$ in the CO-rich effluent flue gas from the first regeneration zone is highly exothermic and liberates large quantities of heat energy, and thus is also an attractive source of process energy from the regenerators.

The combustion of CO-containing flee gas is usually performed under controlled conditions downstream from a catalyst regenerator in a separate CO-boiler or combustion device enriched with air and continuously fed with CO-containing flue gas. The CO-boiler can be equipped to accept at least one other fuel which is used in start-up, or more commonly to supplement the fuel value of the flue gas, or to provide a process fuel when the catalytic cracking apparatus itself is shut down. Such processes are well known. For example, U.S. Pat. Nos. 3,702,308 and 3,401,124 disclose supplying regenerator flue gas to an exhaust gas turbine used to drive a generator, then burning the combustible part of CO contained in the flue gas in a catalytic CO-boiler or in the presence of air and supplementary fuel to recover maximum sensible and combustion heat from the flue gas for use elsewhere in the process. Other examples are described in U.S. Pat. No. 2,753,925 wherein the released heat energy from CO-containing flue gas combustion is employed in the generation of high pressure steam. U.S. Pat. Nos. 3,137,133 and 3,012,962 describe flue gases which are expanded in turbines to produce shaft work. A further example is described in U.S. Pat. No. 3,247,129 wherein exit gases from a catalyst regenerator are led to a boiler in which they are burnt under pressure, supplemental fuel and air being added, after which the combustion gases are discharged from the boiler and expanded in a gas turbine/compressor unit which supplies air for the regenerator and the combustion air for the boiler.

At present, it would therefore be desirable to combine the CO and $CO_2$-rich effluent flue gases from the respective first and second catalyst regeneration zones such that the combined stream can be passed to a single tertiary separator to remove entrained catalyst fines and/or solids, and then expanded in one downstream expansion turbine-compressor unit to supply at least a part of the compressed air required for the regenerators, therein providing significant savings in both equipment and operating costs. It would further be desirable to operate an expansion turbine-compressor unit fed by the combined flue gases which compresses sufficient gas to meet substantially all fluidizing/combustion gas demands, whereby the process can be substantially self-powering.

However, combination of the CO-rich effluent flue gas from the first regeneration zone with flue gas effluent from the second regeneration zone which can contain quantities of oxygen, at high temperatures and pressures may cause combustion or microburning of the combined streams leading to temperatures exceeding the metallurgical limits of process materials. Further, typical heavy hydrocarbon feedstocks cracked in the process may contain many impurities including vanadium, chromium, nickel and other metals found in Groups IB-VIII, inclusive, of the periodic table which can dope or otherwise bind to at least a portion of the catalyst particles and function as combustion promoters during the catalyst regeneration stage. Catalyst dust or particles which exit the regenerators in the flue gas can thus greatly facilitate combustion after combination of the effluent flue gas streams from the first and second generator zones.

SUMMARY OF THE INVENTION

It is therefore an object of this invention to provide an improved process and apparatus having reduced equipment and operating costs for catalytically cracking residual oils at high temperatures wherein catalyst regeneration is conducted in at least two, relatively lower and higher temperature, catalyst regeneration zones.

It is a further object of this invention to provide such a process wherein the effluent flue gases from respective first and second catalyst regeneration zones are combined and utilized to operate a single expansion turbine-compressor which compresses sufficient gas to meet at least the fluidizing/combustion gas needs of the regeneration zones, such that the process is substantially self-powering.

It is still a further object of this invention to provide an integrated plant for carrying out the catalytic cracking of heavy hydrocarbon feedstocks which includes a CO-incinerator/combustor for receiving CO-rich effluent flue gas from a first relatively lower temperature catalyst regeneration zone, and an expansion turbine-compressor which is operated on the combined exit gas from the CO-incinerator/combustor and the effluent flue gas from a second relatively higher temperature catalyst regeneration, zone, which compressor can meet at least the compression requirements of the regenerator zones, and preferably the plant.

Additional objects will become apparent from the following description.

To this end, an improved fluidized catalytic cracking-catalyst regeneration process for catalytically cracking heavy hydrocarbon feedstocks comprising first and second, relatively lower and higher temperature, catalyst regeneration zones is provided wherein the CO-rich effluent flue gas from the first regeneration zone is combusted in a CO-incinerator/combustor means, to substantially convert all CO present therein to $CO_2$. The effluent gas from the CO-incinerator/combustor is then combined with the effluent flue gas from the second regeneration zone with the combined streams thereafter being sent to an expansion turbine-compressor means to recover the work energy therefrom and to provide at least all the compressed air requirements of the first and second regeneration zones, and preferably in addition, the compressed air requirements of the CO-incinerator/combustor means.

Accordingly, in its broadest sense, the process of the present invention thus comprises a fluidized catalytic cracking-catalyst regeneration process for cracking hydrocarbon feedstocks or the vapors thereof with a cracking catalyst in a riser conversion zone to produce hydrocarbon conversion products, then separating the catalyst particles having hydrocarbonaceous deposits thereon from said hydrocarbon conversion products and continuously regenerating said separated catalyst particles successively in separate first and second catalyst regeneration zones by combusting said hydrocarbonaceous deposits on the catalyst in the presence of a source of oxygen under conditions effective to produce a first regeneration zone flue gas rich in carbon monoxide and a second regeneration zone flue gas rich in carbon dioxide wherein the improvement comprises:

(a) combusting the first regeneration zone flue gas in the presence of a source of oxygen to produce a combusted effluent gas containing less than about 0.12 volume percent carbon monoxide;

(b) combining the combusted effluent gas from step (a) with the second regeneration zone flue gas to produce a combined regeneration zone flue gas;

(c) expanding the combined regeneration zone flue gas from step (b) to recover the work energy therefrom and to produce compressed air; and (d) passing the compressed air from step (c) to the first and second regeneration zones to supply all of the compressed air requirements for the regeneration of catalyst particles therein.

By combustion of the CO-rich effluent flue gas from the first regeneration zone in a CO-incinerator/combustor prior to combining with the effluent flue gas from the second regeneration zone, substantially all the CO contained therein is converted to $CO_2$, thus obviating the possibility of combustion or microburning taking place in downstream portions of the plant. As a result of this unique assembly and process, the two effluent streams thus safely combined can be directed to single tertiary separator and expansion turbine-compressor unit.

The process of this invention further comprises indirect or direct recovery of the heat resulting from the combustion of CO in the CO-rich flue gas from the first catalyst regeneration zone in the CO-incinerator/combustor. The heat may, for example, be transferred to partially regenerated catalyst particles leaving the first regeneration zone as a heating source for the relatively higher temperature second catalyst regeneration zone. Additionally, the heat can be absorbed by water in steam or water tubes to produce superheated steam which is used to run additional blowers or electric power generators for supplying process fluidizing/combustion air for the catalyst regeneration zones on other plant air requirements.

The process and apparatus of the present invention will be better understood by reference to the following detailed discussion or preferred embodiments and the attached FIGURE which illustrates and exemplifies such embodiments. It is to be understood, however, that such illustrated embodiments are not intended to restrict the present invention, since many more modifications may be made within the scope of the claims without departing from the spirit thereof.

DETAILED DESCRIPTION OF THE DRAWING

The FIGURE shows an elevation schematic of the apparatus of the invention.

DESCRIPTION OF THE DRAWING

The FIGURE is an elevational schematic of the process and the apparatus of the present invention shown in a combination fluidized catalytic cracking-catalyst regeneration operation wherein catalyst regeneration is conducted successively in two separate first and second, relatively lower and higher temperature, regeneration zones, and where the CO-rich flue gas from the first regeneration zone is combusted in a CO-incinerator/combustor prior to being combined with the flue gas from the second regeneration zone. The combined stream is passed to an expansion turbine-compressor means to recover the work energy therefrom and to produce compressed air which is supplied to the first and second regeneration zones to fulfill fluidizing and combustion requirements of catalyst regeneration therein. A trim cooler and flue gas cooler means are also provided to recover the heat energy from the combined stream to produce superheated steam which can be used to run additional blowers or electrical power generators (not shown) to supply additional fluidizing/combustion compressed air for catalyst regeneration zones or other plant air requirements.

DETAILED DISCUSSION OF PREFERRED EMBODIMENTS OF THE INVENTION

The process and apparatus of the subject invention, as illustrated by a preferred embodiment in the FIGURE, is designed to provide a substantially self-powering, less costly process for fluidized catalytic cracking of heavy hydrocarbon feedstocks. Such feedstocks are preferably economically obtained heavy hydrocarbon feedstocks generally referred to as gas oils, vacuum gas oils comprising residual components, residual oils, reduced crude, topped crude and other high boiling hydrocarbon feeds comprising metallo-organic compounds and the like. These are among several terms used in the art to describe portions of crude oil such as gas oil with or without a higher boiling hydrocarbon feed portion which may comprise metallo-organic compounds, and essentially all other heavy hydrocarbon feedstocks having a Conradson carbon residue of at least 2 weight percent and boiling initially above at least 400° F., with approximately 20 weight percent or more of the components therein boiling at about 1000° F. or above.

As mentioned previously, the subject apparatus adapted for performing a preferred embodiment of the process of the present invention is designed for accomplishing relatively high temperature catalytic cracking of said heavy hydrocarbon feedstocks to produce gasoline boiling range material and other hydrocarbon materials readily converted into gasoline components and fuel oils. The apparatus comprises separate first and second (relatively lower and higher) temperature catalyst regeneration zones such as fully described, for example, in U.S. Pat. Nos. 4,664,778; 4,601,814; 4,336,160; 4,332,674 and 4,331,533 which are incorporated herein by reference. In addition, the apparatus further comprises a CO-incinerator/combustor for receiving a first regeneration zone flue gas and an expansion turbine-compressor unit for receiving the combined effluent from the CO-incinerator/combustor and a second regeneration zone flue gas, and producing compressed air therefrom, and means for providing the thus produced compressed air to the first and second catalyst regeneration zones to supply all the fluidizing/combustion needs thereof, and further means to provide the compressed air to the CO-incinerator/combustor to preferably supply all the compressed air requirements thereof.

Referring now to the FIGURE, fresh hydrocarbon feed to be catalytically cracked, typically comprising a mixture of vacuum gas oil and residual oil, is introduced into a lower portion of an elongated riser reactor 2 by conduit means 4 through a multiplicity of steams in the riser cross section charged through a plurality of horizontally spaced apart feed nozzles represented by nozzle 6. Such nozzles are preferably atomizing feed nozzles of the type described, for example, in U.S. Pat. No. 4,434,049, which is incorporated herein by reference, or some other suitable high energy injection source capable of enabling substantially complete vaporization of the hydrocarbon feed to occur upon contact with hot upwardly flowing freshly regenerated catalyst One or more diluent materials such as, for example, steam or fuel gas may be introduced into the feed nozzles through conduit means 8 to facilitate atomization of the hydrocarbon feed. Hot regenerated catalyst is introduced into a lower portion of riser reactor 2 by transfer conduit means 12 and caused to flow upwardly and become co-mingled with the multiplicity of hydrocarbon feed streams in the riser reactor 2 cross section. The catalyst is preferably at a temperature and in an amount such that upon contact with the atomized feed, the feed rapidly achieves substantially complete vaporization. The hydrocarbon feed is thus mixed with the hot regenerated catalyst under conditions sufficient to form a substantially completely vaporized contact phase of the hydrocarbon feed with high temperature fluid catalyst particles dispersed therein.

The high temperature suspension thus formed and comprising hydrocarbons, diluent and suspended (fluidized) catalyst particles thereafter passes upwardly through riser reactor 2 during which cracked products of hydrocarbon conversion are formed, and also during which hydrocarbonaceous deposits (coke) are formed on the catalyst particles. Riser reactor 2 is thus operated in the manner known to those skilled in the art to produce cracked FCC products. Cracking conditions, for example, for the manufacture of gasoline and gasoline precursors, are well known and typically include temperatures of about 900° F. to about 1020° F., preferably from about 960° F. to about 1000° F. Other reaction conditions in the manufacture of such products typically include reactor pressures of from 15 psig up to about 35 psig, catalyst-to-oil ratios of about 4.5 to 8.5 and riser residence times of 1.5 to 4 seconds (based on the ratio of riser reactor volume to riser outlet volumetric flow rate). Of course, depending upon the desired product selectivity contemplated, cracking conditions are subject to wide variation.

Riser reactor effluent comprising a mixture of vaporized hydrocarbon and suspended catalyst particles including cracked products of conversion can then pass from the upper end of riser reactor 2 to discharge through an initial rough separation in a suspension separator means indicated by 26, such as an inertial separation, wherein volatile hydrocarbons are separated from entrained spent catalyst particles and/or passed to one or more cyclone separators 28 located in the upper portion or vessel 150 for additional separation of volatile hydrocarbons. The separated vaporous hydrocarbons comprising feed material and catalytic conversion products that pass through the separation cyclones 28 and are withdrawn from vessel 150 through conduits means 90, can thereafter be transferred to a downstream fractional distillation means (not shown) for separation of product vapor into a plurality of desired component fractions by processes which are well known.

Spent catalyst particles comprising hydrocarbonaceous deposits separated by means 26 and cyclones 28 are collected as a bed of catalyst 30 in a lower portion of vessel 150. Stripping gas such as steam, or some other suitable material, can be introduced to the lower bottom portion of the bed by conduit means 32 to strip entrained hydrocarbon material from the catalyst particles. Stripped catalyst is passed from vessel 150 into catalyst holding vessel 34, through flow control valve $V_{34}$ and conduit means 36 to a bed of catalyst 38 beaing regenerated in first catalyst regeneration zone 40. Oxygen-containing regeneration gas, such as compressed air, can be introduced into a bottom portion of bed 38 in first regeneration zone 40 by conduit means 42 communicating with air distribution ring 44.

In the first regeneration zone 40 spent catalyst particles having hydrocarbonaceous materials such as coke deposited thereon are regenerated under conditions of oxygen concentration and temperature to selectively burn substantially all the hydrogen associated with the hydrocarbonaceous material and a portion of the carbon and which does not exceed the hyprothermal stability of the catalyst particles or the metallurgical limits of a conventional low temperature regeneration operation. The first regeneration zone is thus maintained under temperature restricted conditions below about 1500° F., preferably below 1300° F., and most preferably restricted to within the range typically from 1110° F. to 1260° F. The relatively mild conditions in the first regeneration zone result in a residual carbon left on the catalyst and the production of CO-rich first regeneration zone flue gas. Further, such conditions serve to minimize localized catalyst hot spots that can form in the presence of steam produced during hydrogen combustion which can substantially reduce catalyst activity. The first regeneration zone flue gas typically having an oxygen content of less than about 0.2 to 0.5 volume percent and a CO content of 2 to 8 volume percent is separated from entrained catalyst fines by one or more cyclone separators, such as cyclones 46 and 48, in parallel or sequential arrangement with each other.

First regeneration zone flue gas typically at a temperature of about 1050° F. to about 1300° F. and pressures of from about 20 to 40 psig, preferably from 27 to 32 psig recovered from the cyclone separators 46 and 48 is withdrawn from first regeneration zone 40 by conduit means 58 and directed through slide valve $V_{58}$ to CO-incinerator/combustor 130.

In accordance with the process of the present invention, the first regeneration zone flue gas, rich in highly combustible CO as set forth hereinabove, is further processed in CO-incinerator/combustor 130 to substantially complete combustion of CO contained therein to produce a combusted first regeneration zone flue gas containing less than about 1200 volumetric parts per million CO. In accordance with the invention, CO combustion completion can be effected by introducing the first regeneration zone flue gas into any of several conventional CO-incinerator/combustors or CO boilers known in the art. An example of such CO-incinerator/combustors useful herein is described in U.S. Pat. No. 3,247,129 in which flue gases exiting from a catalyst regenerator are burnt under pressure, with supplemental fuel and a source of oxygen being added to insure substantially complete combustion of CO present. The CO-combustor/incinerator 130 can be refractory lined and/or constructed of high temperature resistant ceramics, metals and the like, in the combustion and heat transfer areas thereof. Such materials, which are generally used in the construction of high temperature equipment, are well known in the art and may be chosen according to the specific operating conditions employed.

The combustion of the first regeneration zone flue gas is conducted in incinerator/combustor 130 at temperatures ranging from about 1400° F. to about 1900° F. and at pressures of about 8 to about 14 psi less than that of the first regeneration zone flue gas, and in the presence of a source of oxygen which can be introduced as supplemental compressed air or as some other suitable supplemental oxygen-containing source through a multiplicity of conduits means represented by 132. It is preferred in the invention that supplemental compressed air be introduced into incinerator/combustor 130 at a rate sufficient to achieve about 100% to about 130% of the stoichiometric CO content in the first regeneration zone flue gas. CO combustion completion in CO-incinerator/combustor 130 may be facilitated by various methods. For example, one or more torches (not shown) or supplemental fuel burners (also not shown) may be employed at the point of ignition to achieve ignition temperatures. Such torches include, for example, torch oil injection devices which feed highly flammable, hot burning oil or other fuel, to the desired location within the flue gas entry line. A single torch or a plurality may be employed and arranged at different points within the combustion area. Other methods that may be used in addition to, or in place or torches, include oxidants, catalysts, promoters and promotion systems, such as disclosed, for example in U.S. Pat. No. 4,010,094. Further, supplemental fuel oil and the like may be added to CO-incinerator/combustor 130 such that the contents thereof will readily combust. Such supplemental fuel can be passed into CO-incinerator/combustor 130 through conduit means 134.

It will be appreciated by those persons skilled in the art that an additional advantage of the process of the present invention is achieved by taking advantage of the fuel content of the first regeneration zone flue gas and introducing said gas directly into the CO-incinerator/combustor without being cooled, e.g. at exit temperatures from the first regeneration zone, and thereby minimizing the amount of supplemental fuel or auxiliary fuel gas required for self-sustaining normal combustion of CO contained therein at prevailing conditions of oxygen content, temperature and pressure.

Hot effluent gases withdrawn from the CO-incinerator/combustor 130 through conduit means 140 comprise a combusted first regeneration zone flue gas ranging in temperatures from about 1300° F. to about 1900° F. and at pressures of from about 6 to 14 psi less than that of the flue gas exiting zone 40 in conduit means 58, and of very low CO content, typically ranging from about 0.02 to about 0.12 volume percent, and preferably within the range of about 500 to about 1200 volumetric parts per million CO. The oxygen content of the effluent can range from about 0.1 to about 4 volume percent, preferably within the range from about 1 to about 2 volume percent in order to conserve heat within the regeneration zone 40 and CO-incinerator/combustor 130.

As set forth above, catalyst regeneration in the first regeneration zone 40 is conducted under temperature, pressure and oxygen concentration restricted conditions which necessarily retains some residual hydrogen freed carbon on the catalyst for burning removal in a separate higher temperature second regeneration zone 58.

The partially regenerated catalyst, now substantially free of organic hydrogen in residual carbon deposits thereon, is withdrawn from a lower portion of catalyst bed 38 in first regeneration zone 40, for transfer upwardly through riser 52 to discharge into the lower portion of a dense fluid bed of catalyst 54 having an upper interface 56 in an upper separate second catalyst regeneration zone 58. A lift gas, such as compressed air is charged to the bottom inlet of riser 52 by a hollow stem plug valve 60 comprising flow control means (not shown). Additional regeneration gas, such as air or oxygen-enriched gas, is charged to catalyst bed 54 by conduit means 62 communicating with an air distribution ring 64. As shown in the FIGURE, second catalyst regeneration zone 58 is substantially free of exposed metal internals and separation cyclones such that the high temperature regeneration desired may be effected without posing temperature problems associated with materials of construction. Thus, the temperature conditions may be unrestrained and allowed to exceed 1500° F. and reach as high as 1800° F. or as required to substantially complete carbon removal by combustion thereof. Thus, second regeneration zone 58 is operated under conditions of temperature, pressure and oxygen concentration favorable for producing $CO_2$ and unfavorable for producing CO. The temperature in second regeneration zone 50 is therefore not particularly restricted to an upper level except as limited by the amount of carbon to be removed from the catalyst particles, the limitations on the heat tolerance of catalyst particles beyond which catalyst can rapidly deactivate and heat balance restrictions in general of the catalytic cracking-regeneration operation. Preferably, temperatures may range between about 1300° F. and 1600° F. with sufficient oxygen being charged to said second regeneration zone to produce $CO_2$-rich flue gas having traces of CO present, and in amount supporting substantially complete combustion of residual carbon on the catalyst particles preferably to levels of less than about 0.05 weight percent carbon on catalyst. The second catalyst regeneration zone 58 can be a refractory lined vessel or manufactured from some other suitable stable material known in the art.

The $CO_2$-rich second regeneration zone flue gas thus generated passes with some entrained catalyst particles from the dense fluid catalyst bed 54 into a more dispersed catalyst phase thereabove from which the flue gas is withdrawn by conduits 70 and 72 communicating with one or more cyclone separators indicated by 74. Catalyst particles thus separated from the hot flue gases in the cyclones are passed by dipleg means 76 to the bed of catalyst 54 in the second regeneration zone 58. $CO_2$-rich flue gases absent combustion supporting amounts of CO are recovered by conduit means 78 from cyclone separators 74 and thereafter passed to conduit means 112 for treatment more fully described herein below.

Catalyst particles regenerated in second regeneration zone 58 are withdrawn by refractory lined conduit means 80 for passage to catalyst collection vessel 82 and thence by conduit means 84 through flow control valve $V_{84}$ to conduit means 12 communicating with the riser reactor 2 as described hereinabove. Aerating gas, for example, steam or compressed air, can be introduced into a lower portion of vessel 82 by conduit means 86 communicating with a distribution ring within vessel 82. Gaseous material withdrawn from the top portion of vessel 82 by conduit means 88 passes into the upper dispersed catalyst phase of vessel 58.

In accordance with the present invention, the $CO_2$-rich second regeneration zone flue gas stream typically at temperatures ranging from about 1300° F. to about 1800° F., and preferably from about 1330° F. to about 1450° F., and at pressures of from about 6 to about 14 psi less than the first regeneration zone flue gas in conduit means 58, can now be passed through valve $V_{112}$ and safely combined in conduit means 142 with the effluent gases from CO-incinerator/combustor 130 comprising combusted first regeneration zone flue gas which is extremely low in combustible components, e.g. CO and without danger of combustion or microburning taking place which might imperil the metallurgical limits of materials of plant construction. The combined heat energy contained in the combined first and second regeneration zone flue gas streams can now be recovered and used advantageously in the process-apparatus of the present invention. For example, combustion of the CO-rich first regeneration zone flue gas in CO-incinerator/combustor 130 can generate about 4370 Btu/lb. of CO oxidized, which heat energy may be substantially recovered by heat exchange in the production of process steam and in an expansion turbine-compressor unit to generate process compressed air, or employed to power a generator for the further production of process energy. Heat energy from the second regeneration zone flue gas which enters conduit 142 in combination with the combusted first regeneration zone flue gas can also be substantially recovered in combination therewith.

In a typical operation, as shown above, the combination fluidized catalytic cracking-regeneration process of the present invention can require appreciable amounts of compressed fluidizing/combustion gas, particularly in the form of compressed air for the first and second catalyst regeneration zones, supplied by compressors consuming extraneous power. Thus a major operating expense in such a fluidized catalytic cracking operation is the continuing power consumption for compression. Usually, compressed air is supplied by a fired steam power generation wherein boiler requirements per pound per hour of steam can represent large capital investments. The capital costs of turbine facilities, i.e., compressed air supplied by expansion turbine-compressor units are on the same order of magnitude, and no advantage in reducing capital and operating costs can be gained by the application thereof unless such a unit is arranged in a process such that the process is substantially self-powering, i.e., the useful work produced by the expansion turbine-compressor unit is capable of providing the compressed air requirements of the process, or at least that required, for example, by the regeneration zones, and preferably additional supplemental compressed air requirements.

Accordingly, the present invention provides a substantially self-powering fluid catalytic cracking-regeneration process as the combined flue gas streams can be used to operate an expansion turbine-compressor unit which compresses sufficient gas to meet at least the requirements of the first and second regeneration zones, e.g. the fluidizing/combusting gas requirements, and preferably also the supplemental compressed air required in the CO-incinerator/combustor. Further, as illustrated below in this preferred embodiment, combination of the flue gas streams results in consequent substantial savings in process equipment and operational costs as each stream will not have to be individually processed in separate tertiary catalyst fines separators, expansion turbine-compressors and the like.

In accordance with that above, the temperature of the thus combined flue gas streams is typically in the range of from about 1300° F. to about 1800° F., and generally at a pressure of from about 6 to about 14 psi lower than that of the first regeneration zone flue gas in conduit means 58. The combined streams in conduit 142 can be directed to some means wherein the gases are partially cooled such that the temperature of the combined streams to be passed to a downstream tertiary separator 144 and expander turbine 148 is optimized. This cooling is preferably accomplished by employing a trim steam generator 143 to recover the sensible heat from the combined stream in the form of steam represented by conduit 200. This steam can thereafter be employed to power other process equipment (not shown), either in combination with or separate from the process air, or to power steam turbines (also not shown) to provide additional compressed air for the regeneration zones.

The effluent from the steam generator 143, generally at a temperature of from about 1000° F. to about 1400° F., and pressures slightly below that of the second regeneration zone flue gas in conduit means 112, is then preferably passed through conduit means 144 to a tertiary clean-up unit 145 to remove entrained fine catalyst particles and other solid materials from combined flue gas streams. These solid particles can cause excessive wear on the turbine blades of the expansion turbine-compressor unit described hereinbelow. The tertiary clean-up unit 145 can be, for example, an additional cyclone separator or series thereof. A particle-rich stream comprising catalyst fines exits from unit 145 through conduit means 201.

The effluent from the tertiary clean-up unit 145 comprising the combined flue gas streams now substantially free of larger catalyst fines, and generally in the temperature range of from about 1000° F. to about 1400° F. and at a pressure of from about 1 to 2 psi less than in conduit means 144, can then be directed via conduit means 146 into an expansion turbine-compressor 148-150, the turbine portion of which is capable of producing available relative shaft horse power in proportion to the pressure level of the overall system. The turbine 148 may be any type in common use and is linked to a compressor 150 which takes in atmospheric air, via line 160, and compresses it to at least the pressure required by the first and second regenerator zones for combustion and fluidization requirements therein, and preferably in addition, the compressed air required by the CO-incinerator/combustor 130 and other supplemental air requirements. The turbine may also be linked to some other means of equipment (not shown), for example, a generator means to provide power for process use. The compressed air manufactured in compressor 150 and at a pressure of from about 5 to 7 psi above the pressure in the first regeneration zone flue gas in conduit 58 is conducted therefrom through conduit means 162 to conduit means 164 and 166, and through respective valves $V_{164}$ and $V_{166}$ to conduit means 42 and stem plug valve 60 and also be conducted through valve $V_{162}$ to conduit means 62 to supply all of the oxygen-containing regeneration gas requirements for combustion and fluidization in the first and second regeneration zones 40 and 58. Further, compressed air i conduit means 162 can also be conducted through conduit means 168 to multiple conduit means 132 and through valves therein to supply all the oxygen-containing gas requirements for combustion of the first regeneration zone flue gas in the CO-combustor/incinerator. If necessary, supplemental compressed air to CO-incinerator/combustor 130 can be supplied at least in part from compressor 350 through conduit means 180 to conduit means 168.

Exhaust gas from the expansion turbine 150 containing from about 0.02 to about 0.12 volume percent CO, and preferably from about 200 to about 600 volumetric parts per million CO, and at a temperature of from about 1050° F. to about 1250° F. and a pressure of from about 0.2 to 2.0 psig can thereafter be directed to a flue gas cooler 348 to generate process or supplemental steam in conduit means 202, and subsequently passed through conduit means 170 to a final particulate removal means or flue gas scrubber 346 prior to being vented to the atmosphere through conduit means 172.

It will be apparent to those skilled in the art that the apparatus and process of the present invention is applicable in any combination fluidized catalytic cracking-regeneration process employing separate first and second (respective lower and higher temperature) catalyst regeneration zones wherein flue gases therefrom are combined and subsequently directed into a single expansion turbine-compressor unit. For example, in addition to the "stacked" regenerator zones described in the preferred embodiment of the FIGURE, a "side-by-side" catalyst regeneration zone configuration which is described, for example, in U.S. Pat. Nos. 4,601,814; 4,336,160 and 4,332,674 may be employed herein. Further, such fluidized catalyst cracking-regeneration processes which employ two or more riser reactors for cracking different hydrocarbon feed streams, such as described in U.S. Pat. No. 5,009,769 and incorporated herein by reference may also be employed in the process and apparatus of the present invention.

I claim:

1. An apparatus for use in a fluidized catalytic cracking-regeneration process for catalytically cracking heavy hydrocarbon feedstocks comprising:

(a) a reactor defined by a riser conduit for containing fluidized finely-divided catalyst particles for contacting hydrocarbon feedstocks therewith to produce cracked conversion products nd fouled catalyst particles having hydrocarbonaceous deposits thereon;

(b) separator means in flow communication with the riser reactor for receiving the fouled catalyst particles therefrom and separating vaporous hydrocarbon products from the fouled particles;

(c) a first fluidized catalyst regeneration vessel in flow communication along a fouled catalyst conduit with the separator means for receiving the fouled catalyst particles from the separator means and combusting substantially all the organic hydrogen associated with the hydrocarbonaceous deposits on the catalyst particles at temperatures of from about 1050° F. to about 1300° F. in the presence of an effective amount of oxygen-containing gas at pressures ranging from 20 to 40 psig, and producing a first regeneration flue gas having a carbon monoxide content of from about 2 to about 8 volume percent and partially regenerated catalyst, said first regeneration vessel also having an inlet for receiving the oxygen-containing gas required therein for fluidizing and combustion;

(d) CO-combustion/incinerator means in flow communication along a first regeneration flue gas conduit with the first regeneration vessel for receiving the first regeneration flue gas and combusting said flue gas in the presence of an effective amount of oxygen-containing gas at temperatures ranging from 1300° F. to 1900° F., and producing a CO-combustion effluent gas having a carbon monoxide content from about 0.02 to about 0.12 volume percent, said CO-combustion/incinerator means also having an inlet for receiving the oxygen-containing gas required therein for combustion;

(e) a second fluidized catalyst regeneration vessel in flow communication along a partially regenerated catalyst conduit with the first regeneration vessel for receiving the partially regenerated catalyst from the first regeneration vessel and combusting substantially all the carbonaceous deposits on the catalyst at temperatures ranging from 1300° F. to 1600° F., in the presence of an effective amount of oxygen-containing gas and producing a second regeneration flue gas having a carbon monoxide content of from 0.02 to 0.12 volume percent and fully regenerated catalyst having a carbon content of less than about 0.05 weight percent, said second regeneration vessel also having an outlet for passing the fully regenerated catalyst to the reactor riser for further contacting the hydrocarbon feedstocks, and an inlet for receiving oxygen-containing gas required therein for fluidizing and combustion;

(f) a flue gas conduit means in flow communication with both the CO-combustion/incinerator means and the second regeneration vessel for receiving and combining the respective effluents therefrom to form a flue gas combination stream of the CO-combustion/incinerator flue gas stream and the second regeneration flue gas stream;

(g) an expansion turbine-compressor means in flow communication with said flue gas combination conduit means for receiving the flue gas combination stream, and expanding the flue gas combination stream thereby compressing air supplied directly to the expansion-compressor means; and (h) compressed air conduit means for passing the compressed air from the expansion-compressor means to the first regeneration vessel and second regeneration vessel to supply all the oxygen-containing gas required therein for fluidizing and combustion in the regeneration of catalyst therein, and also for passing the compressed air from the expansion-compressor means to the CO-combustion/incinerator means to supply at least a part of the oxygen-containing gas required therein for combustion.

* * * * *